United States Patent
Manners et al.

(10) Patent No.: US 6,678,571 B1
(45) Date of Patent: Jan. 13, 2004

(54) MICRO-SLICING CONTOUR SMOOTHING TECHNIQUE

(75) Inventors: Chris R. Manners, Moorpark, CA (US); Rajeev B. Kulkarni, Valencia, CA (US)

(73) Assignee: 3D Systems, Inc., Valencia, CA (US)

(*) Notice: Subject to any disclaimer, the term of this patent is extended or adjusted under 35 U.S.C. 154(b) by 754 days.

(21) Appl. No.: 09/612,492

(22) Filed: Jul. 7, 2000

(51) Int. Cl.⁷ .......................... G06F 19/00; B29C 35/04
(52) U.S. Cl. ........................................ 700/120; 264/401
(58) Field of Search .......................... 700/98, 117–120, 700/182; 264/401

(56) References Cited

U.S. PATENT DOCUMENTS

| | | | |
|---|---|---|---|
| 5,059,359 A | 10/1991 | Hull et al. | 264/401 |
| 5,137,662 A | 8/1992 | Hull et al. | 264/401 |
| 5,184,307 A | 2/1993 | Hull et al. | 700/182 |
| 5,321,622 A * | 6/1994 | Snead et al. | 700/182 |
| 5,345,391 A | 9/1994 | Hull et al. | 700/182 |
| 5,386,500 A * | 1/1995 | Pomerantz et al. | 345/419 |
| 5,481,470 A * | 1/1996 | Snead et al. | 700/119 |
| 5,776,409 A | 7/1998 | Almquist et al. | 264/401 |
| 5,854,748 A | 12/1998 | Snead et al. | 700/119 |
| 5,870,307 A | 2/1999 | Hull et al. | 700/182 |
| 5,922,364 A * | 7/1999 | Young, Jr. | 425/174.4 |
| 5,943,235 A | 8/1999 | Earl et al. | 700/98 |
| 6,027,682 A | 2/2000 | Almquist et al. | 264/401 |
| 6,084,980 A | 7/2000 | Nguyen et al. | 382/154 |
| 6,193,923 B1 * | 2/2001 | Leyden et al. | 264/401 |
| 6,333,741 B1 * | 12/2001 | Snead et al. | 345/423 |
| 6,532,394 B1 * | 3/2003 | Earl et al. | 700/119 |
| 6,558,606 B1 * | 5/2003 | Kulkarni et al. | 264/401 |
| 6,574,523 B1 * | 6/2003 | Hanna et al. | 700/120 |
| 6,600,965 B1 * | 7/2003 | Hull et al. | 700/120 |
| 6,622,062 B1 * | 9/2003 | Earl et al. | 700/193 |
| 2003/0178750 A1 * | 9/2003 | Kulkarni et al. | 264/401 |

FOREIGN PATENT DOCUMENTS

| | | |
|---|---|---|
| EP | 0655 317 A1 | 5/1995 |
| EP | 1170115 A2 * | 1/2002 |
| JP | 2002067175 * | 3/2002 |

* cited by examiner

*Primary Examiner*—Maria N. Von Buhr
(74) *Attorney, Agent, or Firm*—Ralph D'Alessandro

(57) ABSTRACT

An improved slicing technique is disclosed that employs micro-slicing or intermediate slices by identifying intermediate triangle vertices in the STL data and passing slice layers through each intermediate vertex to create a final build object or part that has smoother contouring, greater accuracy and an improved surface appearance than parts obtained using prior slicing methods.

10 Claims, 5 Drawing Sheets

MICRO-SLICING CONTOUR SMOOTHING TECHNIQUE

FIELD OF INVENTION

The present invention is directed to methods for forming three-dimensional objects on a layer-by-layer basis and, more particularly, is directed to a method of identifying vertices of triangles used in the STL (stereolithography file format) data that is input from Computer Aided Design (CAD) data so that the contour data is accurate, smooth and with no lost features.

BACKGROUND OF THE INVENTION

In recent years many different techniques for the fast production of three-dimensional models have been developed for industrial use. These are sometimes referred to as rapid prototyping and manufacturing ("RP&M") techniques. In general, rapid prototyping and manufacturing techniques build three-dimensional objects layer by layer from a working medium utilizing a sliced data set representing cross-sections of the object to be formed. Typically, an object representation is initially provided by a CAD system.

Stereolithography, presently the most common RP&M technique, may be defined as a technique for the automated fabrication of three-dimensional objects from a fluid-like material utilizing selective exposure of layers of the material at a working surface to solidify and adhere successive layers of the object (i.e., laminae). In stereolithography, data representing the three-dimensional object is input as, or converted into, two-dimensional layer data representing cross-sections of the object. Layers of material are successively formed and selectively transformed or solidified (i.e., cured) using a computer controlled laser beam of ultraviolet (UV) light into successive laminae according to the two-dimensional layer data. During transformation, the successive laminae are bonded to previously formed laminae to allow integral formation of the three-dimensional object.

Stereolithography represents an unprecedented way to quickly make complex or simple parts without tooling. Since this technology depends on using a computer to generate its cross-sectional patterns, there is a natural data link to CAD/CAM. However, such systems have encountered difficulties relating to shrinkage, curl and other distortions, as well as resolution, accuracy, and difficulties in producing certain object shapes.

Although stereolithography has shown itself to be an effective technique for forming three-dimensional objects, various improvements addressing the technology's difficulties have been desired for some time. Many improvements have addressed the aforementioned difficulties and have been made to increase object accuracy and appearance, as well as optimize slicing speed of the build object over the years. However, there still remains a need for further improving the build object appearance and ease of making certain object shapes. Various aspects of the stereolithographic building process can impact the build object appearance and ease of generation of the three-dimensional object. For instance, one aspect and area for needed improvement is the accuracy of contour data generated by slicing the triangles in the STL file format.

Slice™ software is the stereolithographic software program that converts the three-dimensional STL file triangle information or model data into two-dimensional contour SLI data. The Slice software program defines the geometric pattern which the laser in the stereolithography (SLA®) system scans to solidify the photopolymer liquid that is used to form the build object. The STL file triangle data is processed into layer vector data, or the Slice files with the aforementioned SLI data. This is accomplished by taking successive cross-section slices at a specified thickness starting at the bottom of the model. Each slice then represents a two-dimensional cross-section at the given Z-height of the model. The functioning of an SLA® system and utilization of a slicing program is explained in U.S. Pat. Nos. 5,059,359; 5,137,662; 5,184,307; 5,345,391; 5,776,409; 5,854,748; 5,870,307; 5,943,235; 6,027,682; and 6,084,980, all assigned to the assignee of the present invention.

The STL model is defined by a series of triangles that represent the surface of the model. Each triangle is represented by three vertex points, as seen in FIG. 3. The normal formed by these vertex points defines the surface angle of the triangle. The three vertices and the normal define a triangle. The coordinates of each vertex (X, Y, Z) are represented in CAD floating point units. The typical resolution of these points would be at least a 0.0001 for inch and 0.0025 for mm STL models. The contour data produced by the slicing operation is translated from the three-dimensional CAD floating point data to two-dimensional integer SLI data using the slice resolution parameter. Slice resolution defines how many integer slice units are in one CAD unit. A typical slice resolution for inch CAD models is 2,000. This means there are 2,000 slice units per one inch CAD unit.

As the CAD STL data is being read into memory from the file, the triangle vertices are converted from CAD floating point data to SLI integer data using the slice resolution conversion factor. Therefore upon completion of the STL input, all triangle data is represented in integer format. The process of slicing the triangle data is now ready to start, but first an initial Z-starting point must be selected. The optimum Z-starting point is the real Z-bottom of the model. However, a starting Z-plane for a particular model must be selected, keeping in mind any other models that may be being built on the same SLA system platform in the same build cycle so that all the Z-planes at a given slice interval are aligned. Even where the starting slice layers of models being concurrently built are even multiples of the slice thickness, there are many orientations of triangles where the actual triangle Z-components do not lie on a Z-slice boundary layer. This is problematic because, if a model's features lie within the slice layer boundaries and not on the boundaries, those features will be lost. If corrective measures are employed, such as "snapping" or moving all Z-vertices on even slice boundaries, part features may be preserved but part distortion is created. Where triangle vertices lie between layers, the "snapping" of the Z-vertices can create contour data that is inaccurate, rough and therefore undesirable. In some cases the contour data will produce undesired slivers and projections. These problems are solved in the method of the present invention wherein smooth contour data is obtained, eliminating the undesired elements and side effects of prior techniques.

SUMMARY OF THE INVENTION

It is an aspect of the present invention that a smoother contoured build object or part is obtained that does not modify the original STL model data.

It is another aspect of the present invention that the vertices of the triangles in the tessellated build object or model are considered at their exact SLI unit location while performing the slice function.

It is a feature of the present invention that the vertices of the triangles in the STL files are not snapped or moved as the STL data is processed into layer vector data during the slice function.

It is another feature of the present invention that the vertices of the triangles in the tessellated build object or model are identified during the slice function and a slice layer is performed such that intermediate slice layers are inserted between slice layers so that the intermediate slice layers pass through intermediate vertices to produce a smooth contour.

It is yet another feature of the present invention that the intermediate slice layers and the original slice layers are united in a Boolean union function to produce one smooth contour representing the slice layers at n and n+1 in the Z-direction.

It is still another feature of the present invention that intermediate slice layering is performed only on layers that have intermediate triangle vertices.

It is an advantage of the present invention that the contours generated by the micro-slicing technique employing intermediate slicing are smooth and a more accurate representation of the actual STL model than achieved by prior slicing techniques.

It is another advantage of the present invention that the slicing technique does not expend time slicing accurately if a slice layer does not have intermediate vertices.

It is still another advantage of the present invention that the final build object or model obtained by using the micro-slicing or intermediate slicing technique is smoother and more accurate than parts obtained by using prior slicing techniques.

It is yet another advantage of the present invention that the build object has a better surface appearance than parts obtained by using prior slicing techniques.

These and other aspects, features, and advantages are obtained by the present invention through the use of a technique employing micro-slicing or intermediate slices in the original slice layer that pass through the vertices of triangles in the tessellated build object to create a better appearing final part with smoother contours and which is a more accurate representation of the actual STL model.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Figure 1:
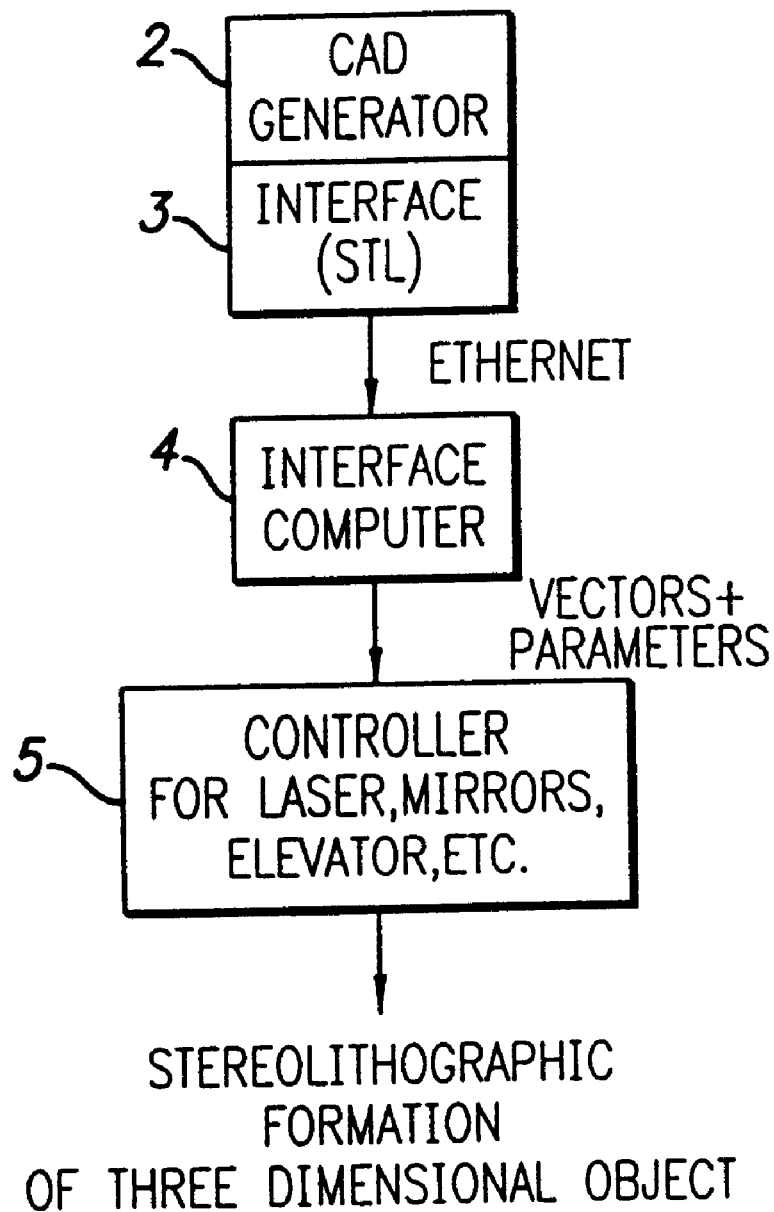
FIG. 1 is an overall block diagram of a stereolithography system for the practice of the present invention.

Referring now to the drawings, and particularly to FIG. 1, there is shown a block diagram of an overall stereolithography system suitable for practicing the present invention. A CAD generator 2 and appropriate interface 3 provide a data description of the object to be formed, typically in STL file format, via network communication such as ETHERNET or the like to an interface computer 4 where the object data is manipulated to optimize the data and provide output vectors. The STL file is a tessellated object description consisting of the X, Y, and Z coordinates of the three vertices of each surface polygon, as well as an index that describes the orientation of the surface normal. The surface polygons preferably are triangles. The manipulated data will reduce stress, curl and distortion, and increase resolution, strength, accuracy, speed and economy of reproduction, even for rather difficult and complex object shapes. The interface computer 4 generates layer data by slicing, varying layer thickness, rounding polygon vertices, filling, scaling, cross-hatching, offsetting vectors, ordering of vectors, and generating up-facing and down-facing skins.

The vector data and parameters from the computer 4 are directed to a controller subsystem 5 for operating the stereolithographic system laser, mirrors, elevator and the like which permit the solid individual layers or laminae that represent cross-sections of the build object or part to be generated and the laminae to be successfully combined to form the three-dimensional part. The part is generated by the application of an appropriate form of energy stimulation as a graphic pattern according to these vector data and parameters at the fluid medium surface to form the thin individual layers or laminae. Each solid layer or individual lamina represents an adjacent cross-section of the three-dimensional object to be produced. Successive adjacent layers or laminae are superimposed as they are formed to generate the three-dimensional object or part.

Figure 2:
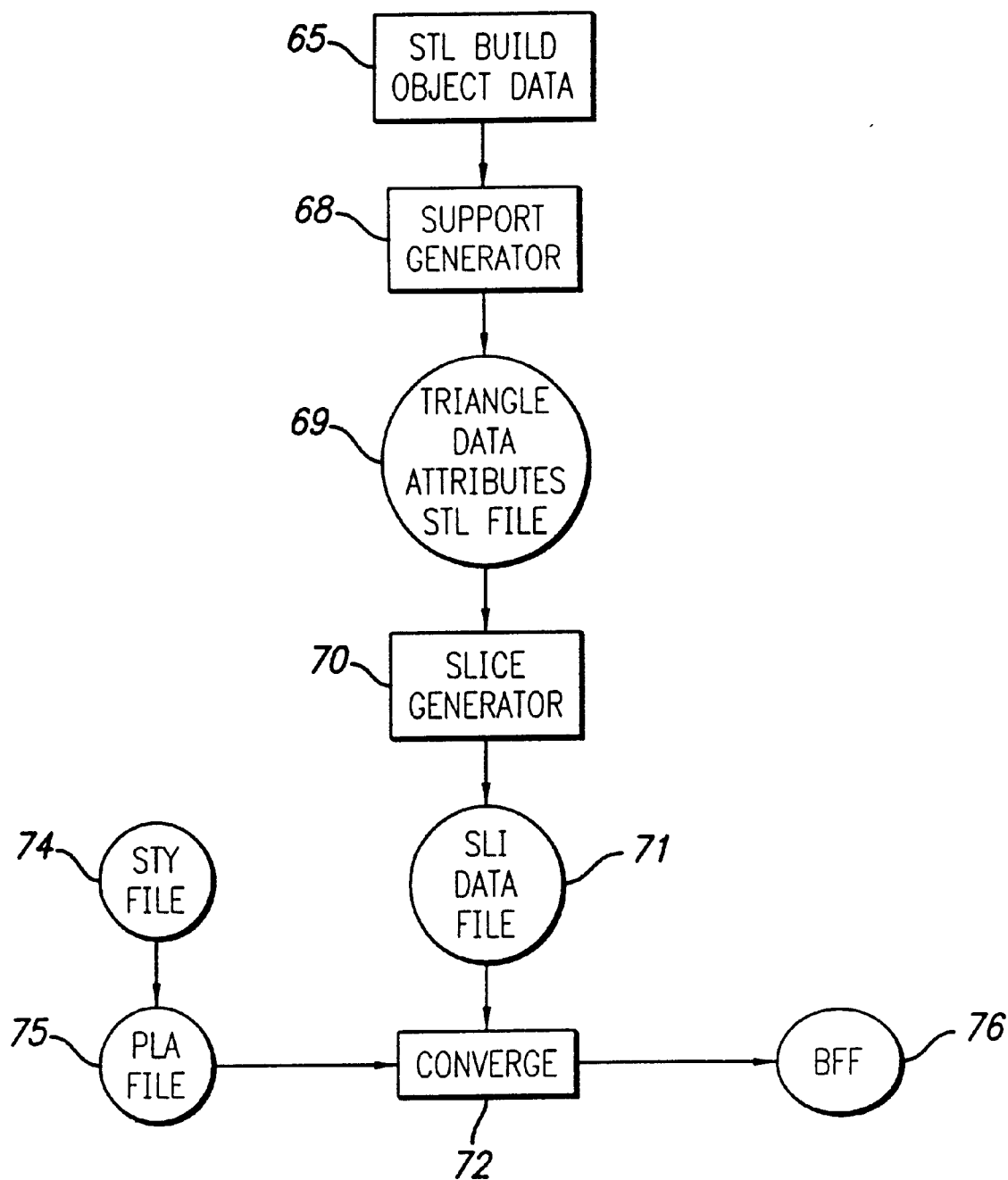
FIG. 2 is a data flow diagram depicting the creation and flow of data to create a build object by the method of the present invention.

As can be seen in FIG. 2, the software creates the build object data STL file 65 and the support generator 68 generates the support structure. The STL file information, which includes support triangle identifying data, is stored in the STL triangle data attributes file 69. This data is then fed to the Slice Generator 70 to create the SLI data file 71 that is generated from the series of closely-spaced horizontal planes being mathematically passed through the tessellated object file.

The build styles from the build style file 74 is fed to the platform file (PLA) 75 which is unique for the particular stereolithography system being employed to make the part. The data is then fed to the converged module 72 which merges the SLI data file 71, the style file 74 and PLA file 75 information to create the build file (BFF) 76. The build file 76, having received the multiple SLI files and merged them, now begins the process of generating the actual physical object using the stereolithography system with its fluid medium or photopolymer chemical.

Figure 3:
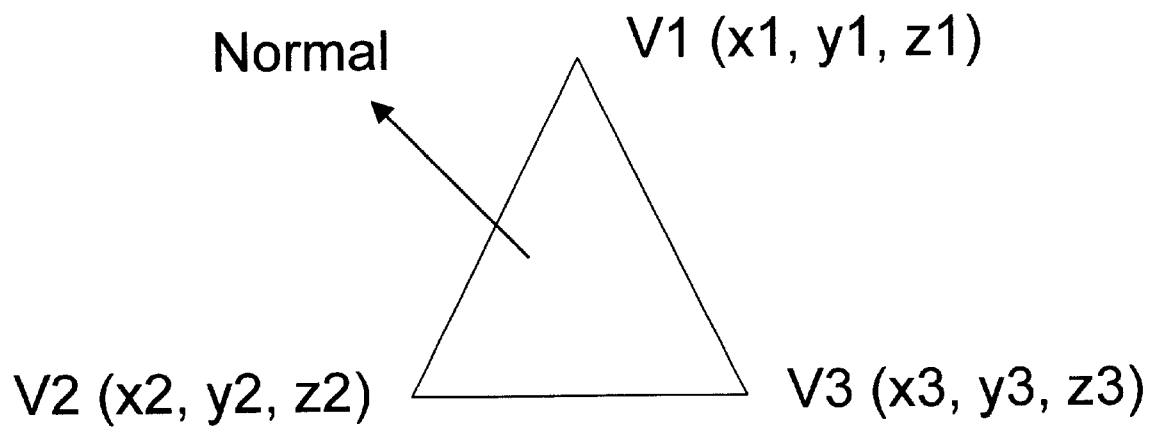
FIG. 3 is a diagrammatic illustration of a surface triangle represented by three vertex points and the normal formed by those vertex points that define the surface angle of the triangle.

The STL build object is defined by a series of triangles that represent the surface of the model. Each triangle is represented by three vertex points, as best seen in FIG. 3. The normal formed by the vertex points defines the surface of the triangle and the coordinates of each vertex (X, Y, Z) are represented in the CAD floating point units. Typical resolution of these points can be from at least about 0.0001 for inch STL models to about 0.0025 for metric STL models. Contour data produced by the slicing operation is translated from the three-dimensional CAD floating point data to the two-dimensional integer SLI data using the slice resolution parameter. Slice resolution defines how many integer slice units are in one CAD unit. A typical slice resolution for inch CAD models is 2,000. In other words, as previously mentioned, there are 2,000 slice units per one inch of CAD unit. Using a 2,000 slice resolution and a slice layer thickness of 0.004 mils, the number of slice layers between slice layer n and slice layer n+1 would equal 8.

As the CAD STL data is read into memory from the file, the triangle vertices are converted from CAD floating point data to SLI integer data using a slice resolution conversion factor. Upon completion of the STL input, all triangle data is represented in integer format and the process of slicing the triangle data starts once an initial Z-starting point is selected. The ideal Z-starting point is the real Z-bottom of the model, but this may need to be adjusted if multiple models are built on the same SLA system platform so that all Z-planes at a given slice interval are aligned. An exemplary algorithm for calculating the Z-slice layer can be employed which goes through the steps of calculating the initial or starting Z-slice layer by (1) converting slice thickness from CAD units to slice units by multiplying slice thickness in CAD units times the slice resolution, (2) converting Z-slice layer from CAD units to slice units by multiplying the Z-slice layer in the CAD times the Z-slice resolution, and (3) rounding off the Z-layer in slice units so that it is an even multiple of slice thickness to obtain a rounded off Z-layer value. This rounding procedure will ensure that all Z-slice layers are even multiples of the slice thickness.

Once the STL data has been represented in integer format, the slicing function is performed, producing a two and one half dimensional cross-sectional representation of the object without snapping or moving any of the vertices of the triangles. The vertices are considered at their actual or exact Z SLI unit location before the slicing operation is performed. Using the prior slicing approaches, such as using only slice layer n and/or slice layer n+1 results in a problematic model because of features within the slice layer boundaries being lost because the actual triangle Z-components and vertices do not lie on a Z-slice boundary layer. The prior solution to this problem was to "snap" or move all Z-vertices onto Z layer boundaries. However, while no features are lost, this results in a modification of the original geometry of the model and causes distortion of the model from the original STL model file data. The moving of the vertices also creates contour data that is inaccurate, rough, jagged and generally undesirable. It can also result in contours that can have undesired slivers and projections.

Figure 5:
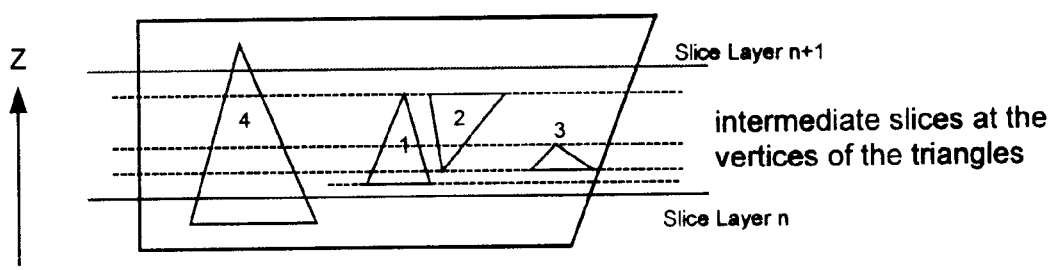
FIG. 5 is a diagrammatic illustration of the use of micro-slicing that employs intermediate slices at the vertices of the triangles (in the tessellated build object) to obtain a more accurate representation of the actual STL model and contours that are smooth.
Figure 6:
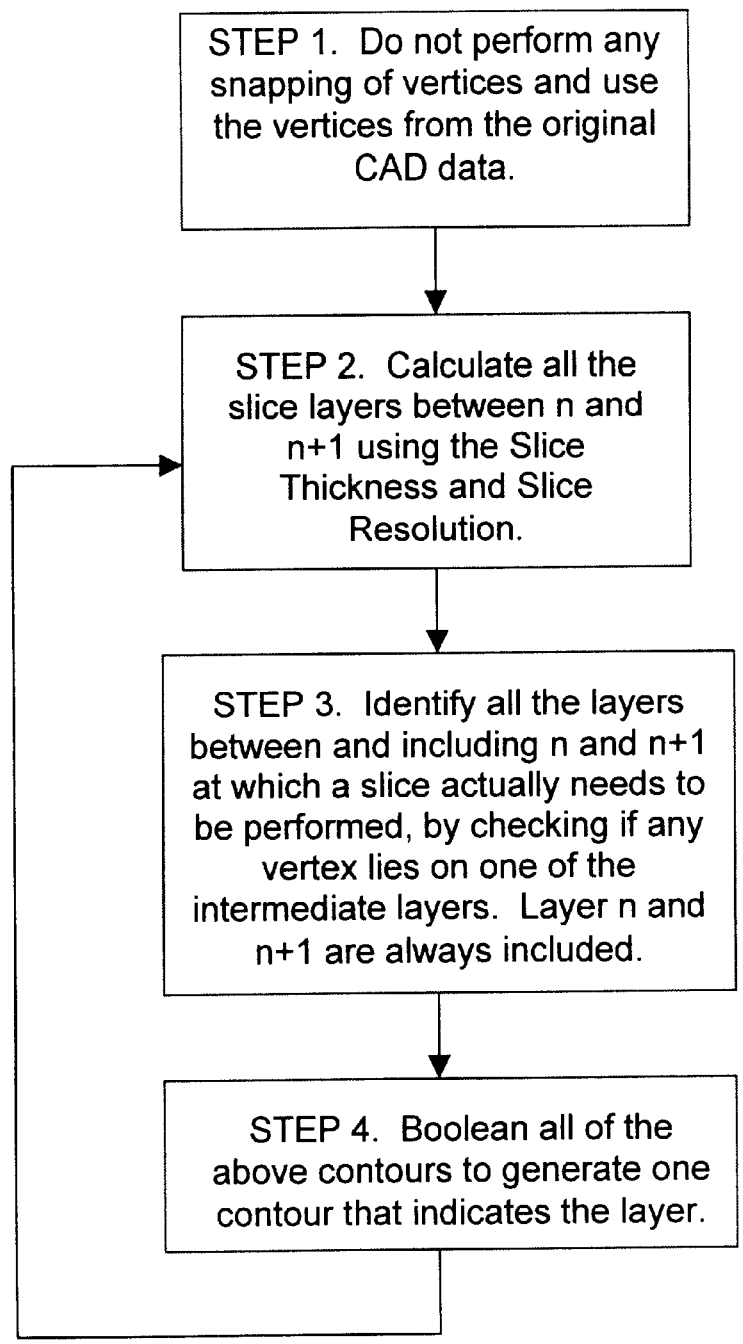
FIG. 6 is a flow chart of the technique employed to obtain the more accurate STL model and smooth contours.

FIG. 5 illustrates the representation where the vertices of each triangle are maintained at its exact or accurate location during the slicing operation and the original data is not modified. First, the slicing operation in the Z-direction generates contours from the original STL model data that is not snapped and is accurate. The technique is performed by not snapping or moving any of the vertices and using the original vertices of the original CAD data. Second, all the slice layers between n layer and n+1 layer are calculated. For example, as stated previously, a layer thickness of about 0.004 mils with a 2,000 slice resolution will have 0.004×2,000=8 slice layers. Third, all layers between and including the n and n+1 boundary layers are identified where a slice actually needs to be performed by checking if the vertex lies on any one of the eight layers. This is the use of intermediate slicing or micro-slicing such that each vertex is included in a slice layer, as best seen in FIG. 5 where the intermediate slices have been inserted between slice layer n and slice layer n+1 so each vertex has a slice boundary layer passing therethrough. Triangle 4 in FIG. 5 exemplifies the case where a triangle spans across both layers n and n+1, which is why layers n and n+1 are always included in the vertex check to identify all layers where a slice needs to be performed. Lastly, a Boolean function is performed on all of the contours generated during the prior identification of all layers at which a slice needs to be performed so that only a single contour is generated that represents the layer at both location n and n+1.

Figure 4:
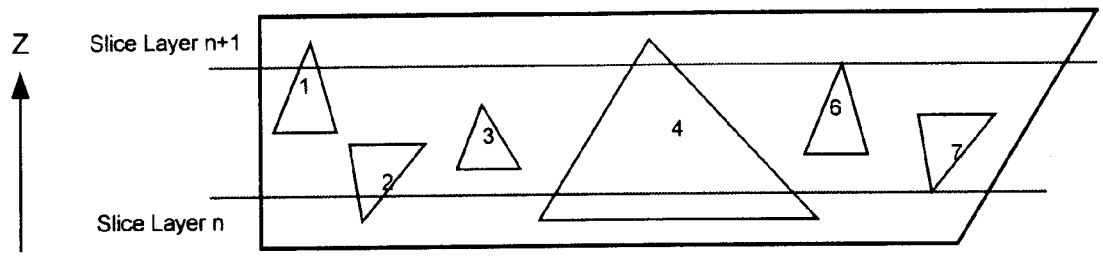
FIG. 4 is a diagrammatic illustration of triangles where the triangle and components do not lie on a Z-slice layer boundary which prior art slicing approaches would result in lost features or undesired triangle data.

This technique or method provides accuracy for all the different orientations of triangles that may be present, such as those shown in FIG. 4. The technique is intuitive to perform the additional intermediate slices only on layers that have intermediate vertices. If there are large triangles being sliced, the slice algorithm does not perform intermediate slices, but optimizes the time and resources spent on computing such that micro-slices are not performed where there are no vertices. This improved slicing technique generates contour data that provides contours which are smooth and are a more accurate representation of the actual STL model, while avoiding rough and jagged contours that can be problematic in the surface finish of a build object or part.

Any suitable fluid medium capable of solidification in response to the application of an appropriate form of energy stimulation may be employed in the practice of the present invention. Many liquid state chemicals are known which can be induced to change to solid state polymer plastic by irradiation with ultraviolet light or other forms of stimulation, such as electron beams, visible or invisible light, or reactive chemicals applied by ink jet or via a suitable mask. Suitable photopolymers that may be employed in the practice of the present invention include any commercially available photopolymer manufactured by Ciba Specialty Chemicals of Los Angeles, Calif., and sold by 3D Systems, Inc. of Valencia, Calif. These include, but are not limited to, SL 7540, SL 5170, SL 5180, SL 5195, and SL 5510 for use in any 3D Systems' commercially available SLA system.

The present invention can be practiced on any stereolithographic equipment, but is discussed in the context of an SLA 7000 system available commercially from 3D Systems, Inc., the assignee of the present invention.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method of forming a three-dimensional object using stereolithography to stimulate a liquid medium to selectively change state to a solid to form the three-dimensional object comprising:

(a) retaining in a container a liquid state medium capable of transformation to a solid state upon the selective application of energy to stimulate a change of state;

(b) receiving a data description of an object to be formed;

(c) manipulating the received data to optimize the data for use in selectively applying energy to stimulate the change of state of the liquid medium to form an object, the manipulating of the received data identifying all vertices within calculated slice layers of the data description of the object and slicing the object such that slice boundary layers pass through each vertex; and (d) selectively applying the energy to the liquid medium in the container to form the three-dimensional object layer by layer, the object being formed by performing a Boolean function on the sliced layers to generate a build object with smooth contours.

2. The method according to claim 1 further comprising calculating all slice layers between n and n+1 utilizing a desired layer thickness and a desired slice resolution.

3. The method according to claim 2 further comprising utilizing intermediate slices in the calculated slice layers such that each slice boundary layer of the intermediate slices passes through a triangle vertex.

4. The method according to claim 1 further comprising using a Boolean union operation as the Boolean function.

5. The method according to claim 1 further comprising manipulating the data received to include converting three-dimensional STL model data into two dimensional contour SLI data to create the build object.

6. A method of processing data to form a three-dimensional object using stereolithography comprising:

(a) receiving a data description of an object to be formed;

(b) manipulating the received data to optimize the data for use in selectively applying energy to stimulate a change of state of a liquid medium to form an object, the manipulating of the received data identifying all vertices within calculated slice layers of the data description of the object;

(c) slicing the object such that slice boundary layers pass through each vertex; and (d) performing a Boolean function on the sliced layers to generate a representation of a build object with smooth contours.

7. The method according to claim 6 further comprising calculating all slice layers between n and n+1 utilizing a desired layer thickness and a desired slice resolution.

8. The method according to claim 7 further comprising utilizing intermediate slices in the calculated slice layers such that each slice boundary layer of the intermediate slices passes through a triangle vertex.

9. The method according to claim 6 further comprising using a Boolean union operation as the Boolean function.

10. The method according to claim 6 further comprising manipulating the data received to include converting three-dimensional STL model data into two dimensional contour SLI data to create a two and one half dimensional cross-sectional representation of the object.

* * * * *